United States Patent
Kim et al.

(10) Patent No.: US 7,751,828 B2
(45) Date of Patent: *Jul. 6, 2010

(54) COMMUNICATION DEVICE HAVING FUNCTION FOR SEARCHING ACCESS POINT OF WIRELESS LOCAL AREA NETWORK AND METHOD THEREOF

(75) Inventors: Jin-Kyeong Kim, Daejeon (KR); Dae-Sik Kim, Daejeon (KR); Nam-Hoon Park, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 1056 days.

This patent is subject to a terminal disclaimer.

(21) Appl. No.: 10/537,144

(22) PCT Filed: Dec. 27, 2002

(86) PCT No.: PCT/KR02/02461

§ 371 (c)(1),
(2), (4) Date: Jan. 4, 2006

(87) PCT Pub. No.: WO2004/052041

PCT Pub. Date: Jun. 17, 2004

(65) Prior Publication Data

US 2006/0148486 A1    Jul. 6, 2006

(30) Foreign Application Priority Data

Dec. 2, 2002    (KR) .................. 10-2002-0075922

(51) Int. Cl.
*H04W 24/00*    (2009.01)
(52) U.S. Cl. .............. 455/456.1; 455/434; 455/432.1; 455/435.1; 455/457; 455/456.6

(58) Field of Classification Search .............. 455/434, 455/432.1, 435.1, 456.1–456.6
See application file for complete search history.

(56) References Cited

U.S. PATENT DOCUMENTS

| | | | |
|---|---|---|---|
| 2002/0059453 A1* | 5/2002 | Eriksson et al. | 709/238 |
| 2002/0184331 A1* | 12/2002 | Blight et al. | 709/217 |
| 2002/0187780 A1* | 12/2002 | Souissi | 455/426 |

(Continued)

FOREIGN PATENT DOCUMENTS

JP    10-185596    7/1998

(Continued)

*Primary Examiner*—Vincent P Harper
*Assistant Examiner*—Dung Lam
(74) *Attorney, Agent, or Firm*—Ladas & Parry LLP (57) ABSTRACT

The present invention relates to a communication device that automatically searches for wireless local area network (WLAN) access points, and to a method thereof. The communication device includes a GPS receiving module (12) for receiving position information of the connection device from a GPS satellite; a WLAN module (11) for connecting with the WLAN access point; a storage unit (13) for storing position information of the WLAN access point; and a controller (14) for selectively operating the WLAN module based on the position information of the communication device output from the GPS receiving module (12) and the position information of the WLAN access point stored in the storage unit (13). According to the present invention, a user terminal receiving data services through WLAN efficiently utilizes power. Also, the searching of the WLAN access points is performed automatically without the need for user manipulation.

7 Claims, 5 Drawing Sheets

U.S. PATENT DOCUMENTS

2003/0040314 A1* 2/2003 Hogan et al. ................. 455/435
2003/0118015 A1* 6/2003 Gunnarsson et al. ........ 370/389

FOREIGN PATENT DOCUMENTS

| | | |
|---|---|---|
| JP | 11-259398 | 9/1999 |
| JP | 2001-060910 | 3/2001 |
| JP | 2001-095058 | 6/2001 |
| JP | 2001-245358 | 9/2001 |
| JP | 2004-165755 | 6/2004 |
| KR | 1020010004627 | 1/2001 |
| WO | WO01/22662 | 3/2001 |
| WO | WO0239759 | 5/2002 |
| WO | WO02093955 | 11/2002 |

* cited by examiner

COMMUNICATION DEVICE HAVING FUNCTION FOR SEARCHING ACCESS POINT OF WIRELESS LOCAL AREA NETWORK AND METHOD THEREOF

BACKGROUND OF THE INVENTION (a) Field of the Invention

The present invention relates to a wireless local area network (WLAN). More particularly, the present invention relates to a communication device having a function for searching an access point of a WLAN, and to a method thereof.

(b) Description of the Related Art

At present, data services provided through mobile communication services are too costly and slow, thereby preventing widespread use of such services. In an effort to remedy this problem, a WLAN module (IEEE 802.11 series) is mounted in a laptop computer or PDA (personal digital assistant), and data services are provided at a low cost and at high speeds (a maximum of 11 Mbps or more) through the WLAN module in areas where there are wireless access points.

WLAN refers to a LAN that performs data reception and transmission between computers or between computers and other communication devices using radio frequencies (RF) or light. WLAN was developed following accelerated improvements in Internet services and wireless communication technology. WLAN is generally used for network connections between buildings, in large offices, and in areas where the set-up of a wired network is difficult to realize. Use of WLAN is rapidly increasing since repair and maintenance are easy in these systems.

In the case where WLAN is used for Internet connection, a user terminal connects to a wired network (a hub, router, etc.) by passing through a WLAN access point, after which connection is made to a server of an Internet service provider through the Internet. The user terminal then receives various Internet services through the ISP server.

When the terminal to which the WLAN module is mounted attempts to receive data services through an access point, it is necessary to detect a beacon signal transmitted by an operating WLAN access point. However, since WLAN access points are not provided in all areas but only in specific areas where it is likely that there will be users desiring data services, it is necessary that the terminal continuously searches for the beacon signal transmitted by the WLAN access points.

Therefore, at areas where there are no WLAN access points, the WLAN module is nevertheless operated to search for WLAN access points such that power is unnecessarily used. To prevent this problem, there may be provided a configuration in which the user activates the WLAN module at areas where there might be WLAN access points. However, this is inconvenient to the user.

SUMMARY OF THE INVENTION

It is one object of the present invention to provide a communication device having a function for searching an access point of a wireless local area network (WLAN), in which WLAN access points are not searched if there are no WLAN access points in operation in the present location of the device to thereby conserve energy.

It is another object of the present invention to provide a communication device that performs the searching of WLAN access points automatically without the need for user manipulation.

The present invention also relates to a method for performing this operation of the communication device.

In one embodiment, the present invention provides a communication device that connects with the Internet through a wireless local area network (WLAN) access point to receive data. The communication device includes a GPS receiving module for receiving position information of the connection device from a GPS satellite; a WLAN module for connecting with the WLAN access point; a storage unit for storing position information of the WLAN access point; and a controller for selectively operating the WLAN module based on the position information of the communication device output from the GPS receiving module and the position information of the WLAN access point stored in the storage unit.

The position information of the WLAN access point includes a position of the WLAN access point and a service radius of the WLAN access point.

The controller operates the WLAN module when the communication device is within the service radius of the WLAN access point, and the WLAN module is operated by control of the controller to detect a beacon signal output by the WLAN access point.

The communication device is connected to a position information server, which is connected to the Internet through the WLAN access point, and receives WLAN access point position information through the position information server to renew the position information stored in the storage unit.

The method for connecting to a WLAN access point, which is connected to the Internet, for a communication device that includes a WLAN module and a GPS receiving module includes a) continuously checking a present position of the communication device through the GPS receiving module; b) determining an operating point of the WLAN module based on stored position information of the WLAN access point and the position information of the communication device; and c) driving the WLAN module to detect a beacon signal periodically transmitted by the WLAN access point, and connecting to the WLAN access point with the detected beacon signal.

The method further includes d) receiving new position information of the WLAN access point from a position information server that is connected to the Internet following connection to the WLAN access point, and renewing the stored position information.

In addition, step d) includes transmitting a "New Position Information Verification" message to the position information server through the WLAN module; receiving from the position information server a reply to the above message, that is, a "Position Information Renewal" message or a "No New Information" message; and receiving new position information of the WLAN access point from the position information server in the case where the communication device receives the "Position Information Renewal" message, and performing processes to renew the position information.

The method further includes receiving the "New Position Information Verification" message by the position information server; checking version information of WLAN access point position information that the communication device has from the "New Position Information Verification" message; transmitting the "Position Information Renewal" message in the case where a first version of the WLAN access point position information that the communication device has is older than a second version of a present WLAN access point position information; transmitting the "No New Information" message if the first version is identical to the second version; and transmitting WLAN access point position information corresponding to the second version after the "Position Information Renewal" message is sent.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

Figure 1:
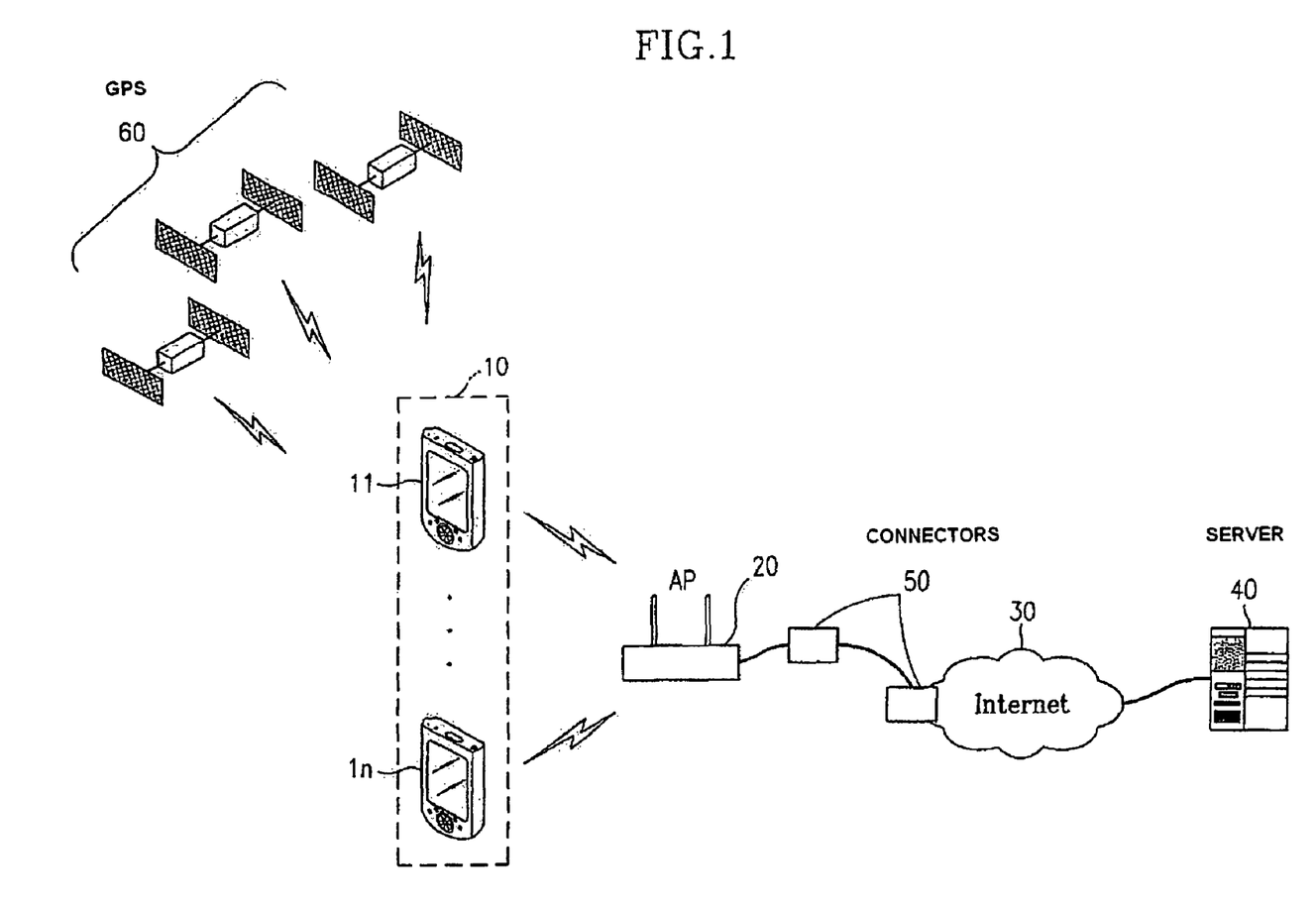
FIG. 1 is a drawing illustrating a network structure for wireless Internet connection according to a preferred embodiment of the present invention.

FIG. 1 is a drawing illustrating a network structure for wireless Internet connection according to a preferred embodiment of the present invention.

With reference to the drawing, a plurality of communication devices (i.e., user terminals 10) is connected to a wireless local area network (WLAN) access point 20. The WLAN access point 20 is connected to the Internet 30 through a connecting assembly 50, and to a plurality of servers that provide various services through the Internet 30. In the preferred embodiment of the present invention, the final connection is made to a position information server 40, which provides position information of WLAN access points.

The user terminals 10 receive the various services through the WLAN access point 20, which is connected to the Internet 30 as described above. Further, the user terminals 10 automatically perform a WLAN access point position renewal program to obtain the most recent WLAN access point position information through the position information server 40, which is also connected to the Internet 30 as described above. It is determined, after comparing position information of the user terminals 10 received from a plurality of GPS (global positioning system) satellites 60 and WLAN access point position information received from the position information server 40, whether the user terminals 10 are within a service range of the WLAN access point 20.

Figure 2:
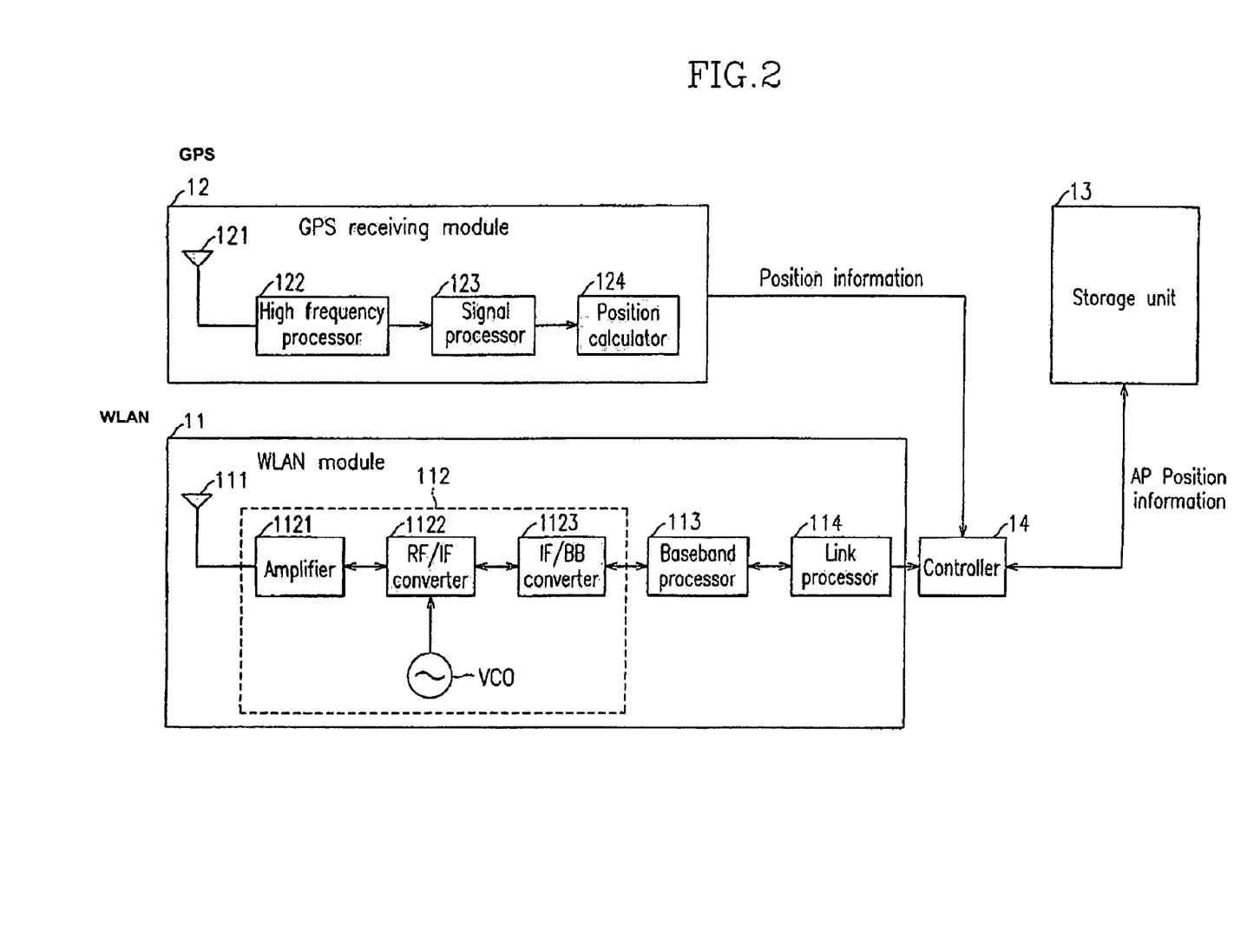
FIG. 2 is a schematic view of a communication device according to a preferred embodiment of the present invention.

FIG. 2 is a schematic view of one of the user terminals 10 according to a preferred embodiment of the present invention.

As shown in the drawing, the user terminal 10 includes a WLAN module 11 that connects to the WLAN access point 20 to receive various information from the Internet 30, a GPS receiving module 12 that receives terminal position information from the GPS satellites 60, a storage unit 13, and a controller 14. The storage unit 13 is either an external or internal memory device that stores the most recent WLAN access point position information obtained through the Internet 30.

The GPS receiving module 12 receives signals transmitted from the GPS satellites 60, which determine positions of moving objects on the earth's surface using distance and velocity calculations, and calculates terminal position information. The GPS receiving module 12 includes a GPS antenna 121 for receiving GPS data from three or more of the GPS satellites 60, a high frequency processor 122 that converts high frequency signals received through the GPS antenna 121 into low frequency signals, a signal processor 123 that despreads spectrum spreading to obtain messages and a pseudo range transmitted from the GPS satellites 60, and a position computation unit 124 for determining a present position of the user terminal 10 based on the messages and pseudo range. The position information of the user terminal 10 obtained in this manner is in a format that includes latitudinal and longitudinal information.

The WLAN module 11 performs various WLAN (IEEE 802.11b/a) connection functions. As shown in FIG. 2, the WLAN module 11 includes an antenna 111 for transmitting wireless data to and receiving wireless data from the WLAN access point 20; an RF unit 112 performing reception processing of RF signals received from the WLAN access point 20 through the antenna 111, and performing transmission processing of data transmitted to the WLAN access point 20 from the user terminal 10 into high-frequency, or RF signals; a baseband processor 113 demodulating signals processed by and received from the RF unit 112, and modulating data for transmission; and a link processor 114 for performing data link processing using a standard protocol (IEEE 802.11b in the case of WLAN) between the WLAN access point 20 and the controller 14 of the user terminal 10. The RF unit 112 of the WLAN module 11 includes an amplifier 1121 for amplifying received signals and signals to be transmitted, an RF/IF converter 1122 connected to an oscillator (VCO) and performing signal conversion between RF signals and intermediate frequency signals, and an IF/BB converter 1123 for performing signal conversion between the IF signals received from the RF/IF converter 1122 and baseband signals.

The controller 14 of the user terminal 10 determines whether the user terminal 10 is in a service range of the WLAN access point 20 based on WLAN access point position information stored in the storage unit 13 and terminal position information provided from the GPS receiving module 12. The controller 14 then selectively operates the WLAN module 11 depending on the result of this determination to thereby receive signals transmitted from the WLAN access point 20. The controller 14 is either included as part of the WLAN module 11 or provided as a separate unit from the WLAN module 11.

Figure 3:
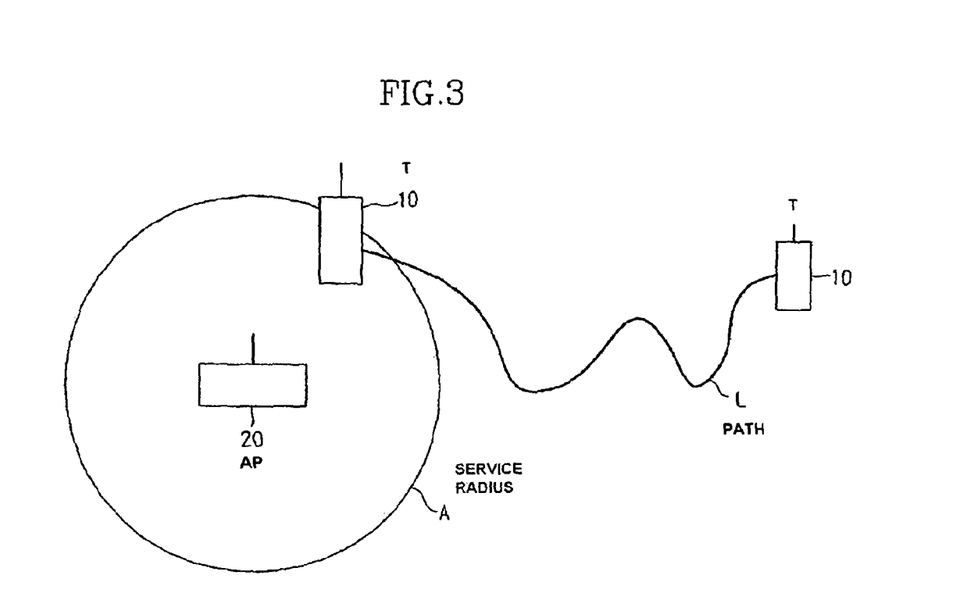
FIG. 3 is a drawing illustrating a process for detecting a beacon signal of a wireless local area network access point while a communication device is moving according to a preferred embodiment of the present invention.

FIG. 3 is a drawing illustrating a process for detecting a beacon signal of the WLAN access point 20 while the user terminal 10 is moving.

As shown in the drawing, the user terminal 10 passes through a random path L and must reach a service region A of the WLAN access point 20, that is, a region that is reached by the beacon signal, in order to detect an operating WLAN access point and receive data services through WLAN.

Next, connection to a WLAN access point of a terminal according to a preferred embodiment of the present invention will be described in detail.

Figure 4:
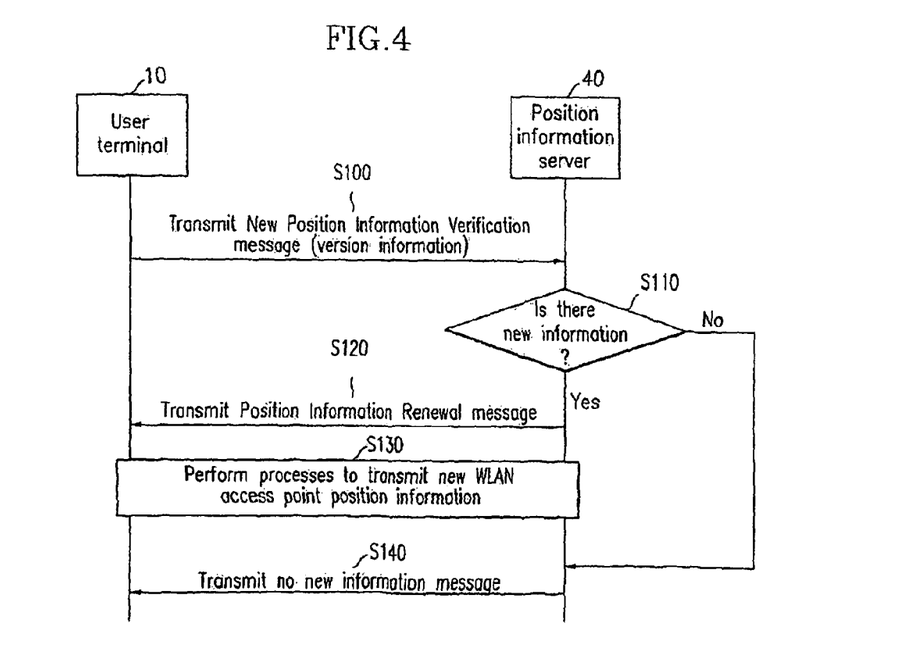
FIG. 4 is a flow chart of the exchange of signal messages between a communication device and a wireless local area network access point position information server according to a preferred embodiment of the present invention.

FIG. 4 is a flow chart of the exchange of signal messages between the user terminal 10 and the WLAN access point position information server 40.

With reference to FIG. 4, if the user terminal 10 enters a service region of a WLAN access point, a "New Position Information Verification" message, which contains version information (hereinafter referred to as first version information) of WLAN access point position information that the user terminal 10 presently has, is transmitted to the position information server 40, which is connected to the Internet 30 through the WLAN module 11, in step S100.

The position information server 40 that receives the "New Position Information Verification" message through the Internet 30 extracts the first version information from the message and compares it with version information of WLAN access point position information that it has (hereinafter referred to as second version information) in step S110.

In the case where the first version information that the user terminal 10 has is older than the second version information, the position information server 40 transmits a "Position Information Renewal" message to the user terminal 10 in step S120, then performs the processes for transmitting the new WLAN access point position information to the user terminal 10 in step S130.

If the user terminal 10 has new WLAN access point position information (i.e., if the first version information is identical to the second version information), the position information server 40 transmits a "No New Information" message to the user terminal 10 and it is assumed that the position information of the user terminal 10 is the new information in step S140.

All the above processes are performed automatically without any manipulation required by the user.

Figure 5:
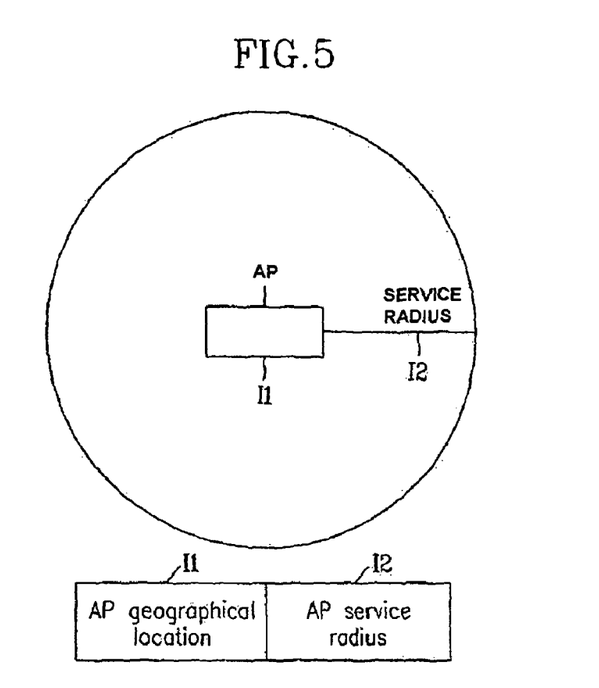
FIG. 5 is a drawing showing a structure of wireless local area network access point position information according to a preferred embodiment of the present invention.

FIG. 5 is a drawing showing a structure of the WLAN access point position information that is transmitted to the user terminal 10 by the position information server 40.

The WLAN access point position information includes a WLAN access point geographical position I1 and a WLAN access point service radius I2. The WLAN access point geographical position I1, in turn, includes latitudinal and longitudinal information that may be precisely determined through a GPS. The WLAN access point service radius I2 is a distance from the WLAN access point geographical position I1 in which WLAN access point service is possible (e.g., 10 meters). To obtain more precise service radius information, the actual WLAN access point service radius may be used after measuring the same.

If the above position information reception and renewal processes of the WLAN access point 20 are performed through the position information server 40 as described above, the controller 14 of the user terminal 10 either stores WLAN access point position information in the storage unit 13 or renews the stored position information. There may be information of more than one WLAN access point position stored in the storage unit 13.

With the reception and renewal of WLAN access point position information, the user terminal 10 selectively performs WLAN access point connection based on the position information.

Figure 6:
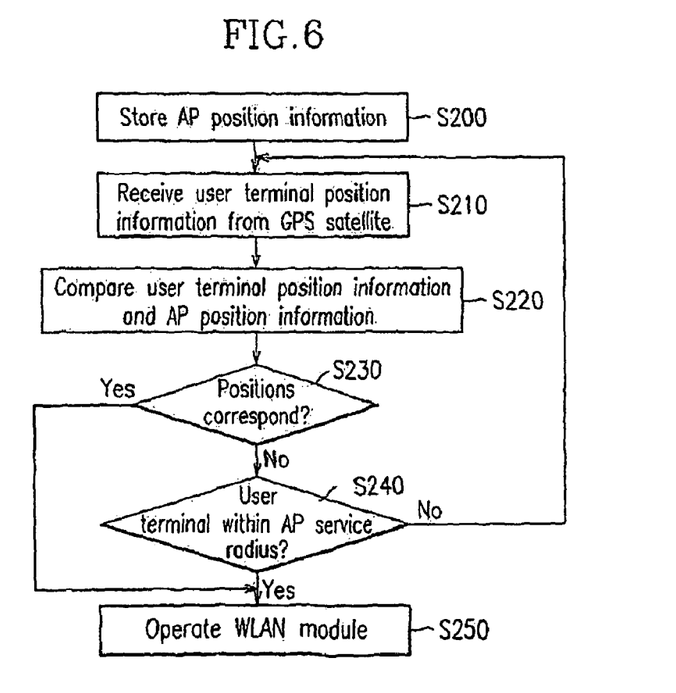
FIG. 6 is a flow chart of an operation of a communication device according to a preferred embodiment of the present invention.

FIG. 6 is a flow chart showing the sequential operations of the user terminal 10.

After the WLAN access point position information is received from the position information server 40 and stored, the user terminal 10 continuously checks its own position through the GPS satellites 60 and compares this with the stored WLAN access point position information. In more detail, the GPS receiving module 12 receives GPS data transmitted from the GPS satellites 60 to calculate the position of the user terminal 10, then the controller 14 compares the terminal position information provided by the GPS receiving module 12 with the WLAN access point position information stored in the storage unit 13 (steps S200~S220).

That is, the controller 14 compares the geographical position included in the WLAN access point position information with the user terminal position in step S220. If the WLAN access point position and user terminal position do not correspond, the controller 14 then determines if the user terminal position is within the WLAN access point service radius (steps S230 and S240).

If the user terminal position corresponds with the WLAN access point position, or if the user terminal is within the WLAN access point service radius, the controller 14 determines that the user terminal 10 has entered the service region of the WLAN access point 20 and operates the WLAN module 11 to thereby detect the beacon signal transmitted by the WLAN access point 20 in step S250. Data services are then received through the WLAN access point 20.

Figure 7:
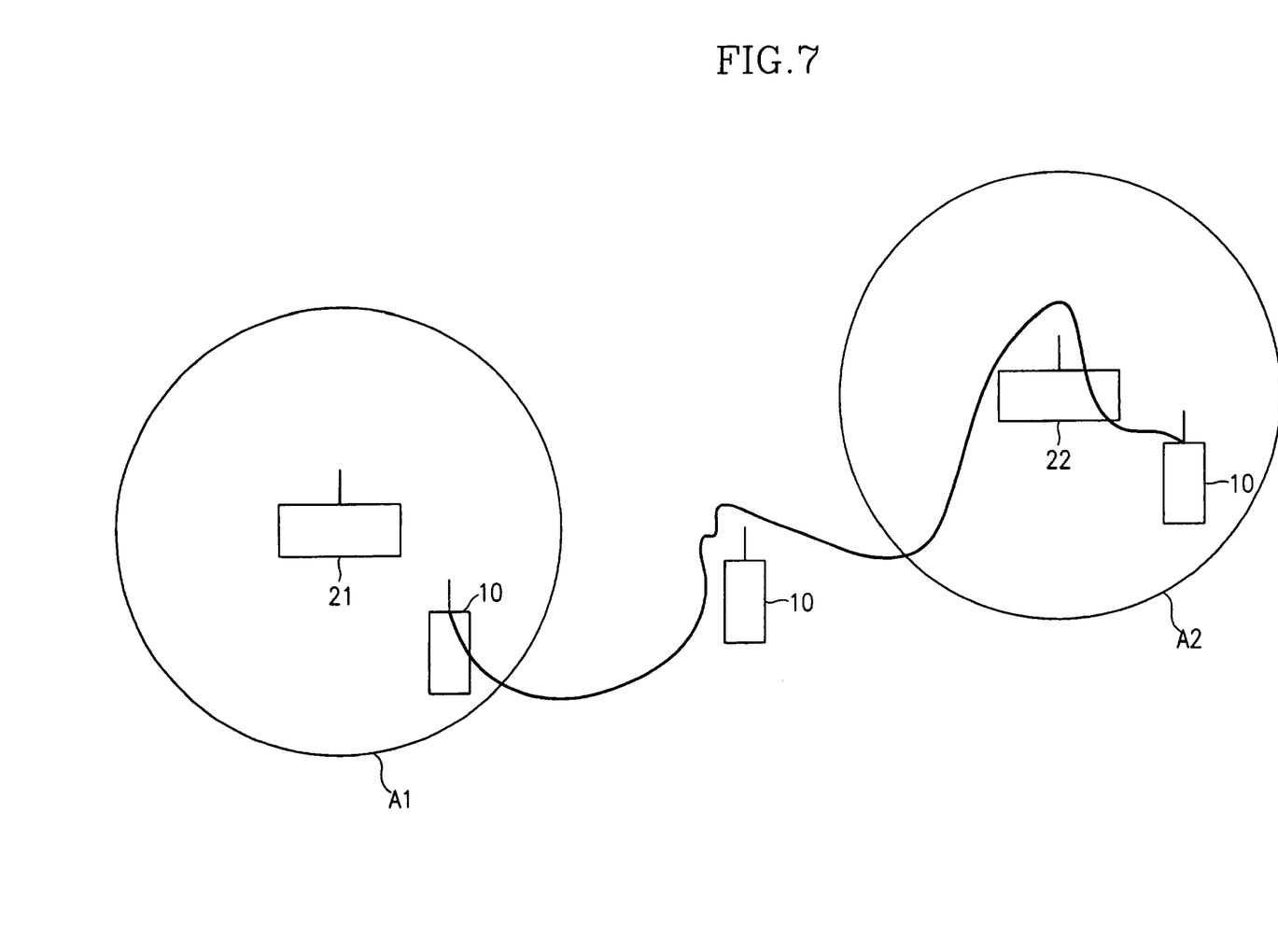
FIG. 7 is a drawing showing an example of the relation between a communication device and wireless local area network access point locations as the communication device is moved according to a preferred embodiment of the present invention.

FIG. 7 is a drawing showing an example of the relation between the user terminal 10 and WLAN access point locations as the user terminal 10 is moved.

If the user terminal 10 enters a service region A1 of a WLAN access point 21, the user terminal 10 detects the beacon signal transmitted by the WLAN access point 21 then receives data services through the WLAN access point 21. If the user terminal 10 leaves the service region A1 of the WLAN access point 21, since data services may no longer be received through the WLAN access point 21, the controller 14 of the user terminal 10 stops the operation of the WLAN module 11 to conserve energy.

The determination of whether the user terminal 10 is within a service region of a WLAN access point is made by comparing the position information of the user terminal 10 received from the GPS satellites 60 with the stored WLAN access point position information as described above. If it is determined that the user terminal 10 enters a service region A2 of another WLAN access point 22, the controller 14 operates the WLAN module 11 to detect the beacon signal transmitted by the WLAN access point 22. Data services are then received through the WLAN access point 22.

In the preferred embodiment of the present invention described above, power is efficiently used by the user terminal that receives data services through a WLAN. In more detail, when a terminal that has both a WLAN module and a GPS receiving module operates to receive services through an operating WLAN access point, the position information of the terminal itself received through the GPS receiving module is compared with the WLAN access point position information stored in the terminal. Only if the terminal is within the service region of the WLAN access point are the processes to receive data services performed. If the terminal is not within the service region of the WLAN access point, searching of operating WLAN access points is also continuously performed. Because the WLAN module is operated only when needed, power consumption is minimized.

In addition, the user terminal automatically performs the comparison of the user terminal and WLAN access point positions, in addition to the searching of WLAN access points. As a result, the user does not experience the inconvenience of having to manually activate the search function.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A communication device that connects with a network through a wireless local area network (WLAN) access point to receive data, the communication device comprising:
   a GPS receiving module for receiving position information of the connection device from a GPS satellite;
   a WLAN module for connecting with the WLAN access point;
   a storage unit for storing position information of the WLAN access point; and
   a controller for selectively operating the WLAN module based on the position information of the communication device output from the GPS receiving module and the position information of the WLAN access point stored in the storage unit,
   wherein the controller receives new WLAN access point position information after receiving a "Position Information Renewal" message from a position information server according to checking result of version information on the WLAN access point position information, and renews the stored position information, and
   where in the controller receives a "New Position Information Verification" message from the position information server of the "Position Information Renewal" message or a "No New information" message,
   receiving a new position information of the WLAN access point from the position information server in the case where the communication device receives the "Position Information Renewal" message, and performing processes to renew the position information; and
   the position information server checking version information of WLAN access point position information that the communication device has from the "New Position Information Verification" message,
   transmitting the "Position Information Renewal" message to the communication device in the case where a first version of the WLAN access point position information that the communication device has is older than a second version of present WLAN access point position information;
   transmitting the "No New Information" message to the communication device if the first version is identical to the second version; and
   transmitting the new WLAN access point position information corresponding to the second version to the communication device after the "Position Information Renewal" message is sent.

2. The communication device of claim 1, wherein the position information of the WLAN access point includes a position of the WLAN access point and the service radius of the WLAN access point.

3. The communication device of claim 2, wherein the controller operates the WLAN module when the communication device is within the service radius of the WLAN access point.

4. The communication device of claim 2, wherein the WLAN module is operated by control of the controller to detect a beacon signal output by the WLAN access point.

5. The communication device of claim 1, wherein the communication device is connected to the position information server, which is connected to the Network through the WLAN access point, and receives WLAN access point position information through the position information server to renew the position information stored in the storage unit.

6. A method for connecting to a wireless local area network (WLAN) access point, which is connected to a network, for a communication device that includes a WLAN module and a GPS receiving module, the method comprising:
   a) continuously checking a present position of the communication device through the GPS receiving module;
   b) determining an operating point of the WLAN module based on stored position information of the WLAN access point and the position information of the communication device;
   c) driving the WLAN module to detect a beacon signal periodically transmitted by the WLAN access point, and connecting to the WLAN access point with the detected beacon signal; and
   d) receiving new position information of the WLAN access point from a position information server that is connected to the network following connection to the WLAN access point, and renewing the stored position information,
   wherein the communication device receives the new WLAN access point position information after receiving a "Position Information Renewal" message according to checking result of version information on the WLAN access point position information by the position information server,
   transmitting the "New Position Information Verification" message to the position information server through the WLAN module;
   receiving from the position information server a reply to the above message, that is, the "Position Information Renewal" message or a "No New Information" message; and
   receiving the new position information of the WLAN access point from the position information server in the case where the communication device receives the "Position Information Renewal" message, and performing processes to renew the position information,
   checking version information of WLAN access point position information that the communication device has from the "New Position Information Verification" message;
   transmitting the "Position Information Renewal" message to the communication device in the case where a first version of the WLAN access point position information that the communication device has is older than a second version of present WLAN access point position information;
   transmitting the "No New Information" message to the communication device if the first version is identical to the second version; and
   transmitting the new WLAN access point position information corresponding to the second version to the communication device after the "Position Information Renewal" message is sent.

7. The method of claim 6, wherein the WLAN access point position information includes access point position information and access point service radius information.

* * * * *